(12) United States Patent
Zhao et al.

(10) Patent No.: US 9,746,096 B2
(45) Date of Patent: Aug. 29, 2017

(54) FOUR-STATE ADJUSTABLE AIR PATH STRUCTURE

(71) Applicant: HARBIN INSTITUTE OF TECHNOLOGY, Harbin, Heilongjiang (CN)

(72) Inventors: Bo Zhao, Heilongjiang (CN); Jianwei Wu, Heilongjiang (CN); Jiubin Tan, Heilongjiang (CN); Lei Wang, Heilongjiang (CN)

(73) Assignee: HARBIN INSTITUTE OF TECHNOLOGY, Harbin, Heilongjiang (CN)

(\*) Notice: Subject to any disclaimer, the term of this patent is extended or adjusted under 35 U.S.C. 154(b) by 0 days.

(21) Appl. No.: 15/111,750

(22) PCT Filed: Dec. 26, 2014

(86) PCT No.: PCT/CN2014/095122
§ 371 (c)(1),
(2) Date: Jul. 14, 2016

(87) PCT Pub. No.: WO2015/120748
PCT Pub. Date: Aug. 20, 2015

(65) Prior Publication Data
US 2016/0356392 A1 Dec. 8, 2016

(30) Foreign Application Priority Data
Feb. 14, 2014 (CN) .......................... 2014 1 0051866

(51) Int. Cl.
*F15B 13/04* (2006.01)
*F16K 31/06* (2006.01)
(Continued)

(52) U.S. Cl.
CPC .......... *F16K 31/0603* (2013.01); *F15B 1/265* (2013.01); *F15B 21/048* (2013.01);
(Continued)

(58) Field of Classification Search
CPC ...... F16K 31/0603; F16K 11/02; F15B 1/265; F15B 21/048; F15B 11/068; F15B 11/064;
(Continued)

(56) References Cited

U.S. PATENT DOCUMENTS 3,700,396 A 10/1972 Adams
6,453,936 B1 \* 9/2002 Frank ...................... B60T 8/323
137/315.03
(Continued)

FOREIGN PATENT DOCUMENTS

CN 201059293 5/2008
CN 201232673 5/2009
(Continued)

OTHER PUBLICATIONS

International Search Report of International Application No. PCT/CN2014/095122 dated Mar. 25, 2015.

*Primary Examiner* — Craig J Price
(74) *Attorney, Agent, or Firm* — Ping Wang; Andrews Kurth Kenyon LLP

(57) ABSTRACT

This invention relates to a four-state adjustable air path structure. An air source is connected to an air storage tank and a first two-position three-way solenoid valve via a check valve. The first two-position three-way solenoid valve is connected to a second two-position three-way solenoid valve and a vent hole. The second two-position three-way solenoid is connected to a third two-position three-way solenoid valve and a port of a throttle valve. Another port of the throttle valve is connected to the third two-position
(Continued)

three-way solenoid valve. The third two-position three-way solenoid valve is connected to an air tank. The present four-state adjustable air path structure simplifies processing and maintenance of a mechanical structure. Intellectual control of an operating speed can also be achieved. The present invention has advantages such as structural simplicity, low manufacturing costs, safe and reliable operation, long service life, and suitability for long-distance transmission.

1 Claim, 5 Drawing Sheets

(51) Int. Cl.
  *F15B 1/26* (2006.01)
  *F15B 21/04* (2006.01)
  *F16K 11/02* (2006.01)
(52) U.S. Cl.
  CPC ....... *F16K 11/02* (2013.01); *Y10T 137/87169* (2015.04); *Y10T 137/87917* (2015.04)

(58) Field of Classification Search
  CPC ............. F15B 11/06; Y10T 137/87917; Y10T 137/87169
  USPC .................. 137/596, 613; 91/444, 448, 445; 60/410; 141/3, 20, 302
  See application file for complete search history.

(56) References Cited

U.S. PATENT DOCUMENTS

| 7,032,423 B2* | 4/2006 | Caporusso | B21D 7/08 72/175 |
| 2014/0059576 A1* | 2/2014 | Mule | G06T 11/80 725/10 |

FOREIGN PATENT DOCUMENTS

| CN | 201359193 | 12/2009 |
| CN | 103206424 | 7/2013 |
| CN | 103790884 | 5/2014 |

* cited by examiner

FOUR-STATE ADJUSTABLE AIR PATH STRUCTURE

TECHNICAL FIELD

The present invention pertains to an air storage-type pneumatic actuating mechanism, and particularly relates to a four-state adjustable air path structure.

BACKGROUND ART

Currently, in some special occasions in the fields of electricity, petroleum and chemical industry, it is necessary to control valves in many cases such that the valves can be closed rapidly when the hydraulic pressure source is cut off. However, ordinary hydraulic mechanisms not only have difficulties in meeting this demand, but also are accompanied by a series of issues such as large consumption, low efficiency, high heat generation, and poor security.

SUMMARY

In view of the problems existing in the prior art, an object of the present invention is to provide a four-state adjustable air path structure that is characterized by rapid and reliable operation, little power consumption, high efficiency and better security.

The object of the present invention is achieved by the following technical solution: an air source is respectively connected to an air storage tank and a port $a_1$ of a two-position three-way solenoid valve A via a check valve; a port $c_1$ and a port $b_1$ of the two-position three-way solenoid valve A are respectively connected to a port $c_2$ of a two-position three-way solenoid valve B and a vent hole; a port $a_2$ and a port $b_2$ of the two-position three-way solenoid valve B are respectively connected to a port $b_3$ of a two-position three-way solenoid valve C and a port of a throttle valve; another port of the throttle valve is connected to a port $a_3$ of the two-position three-way solenoid valve C; and a port $c_3$ of the two-position three way solenoid valve C is connected to an air tank. In this way, a four-state adjustable air path structure is formed.

The present invention has the following characteristics as compared with the prior art.

By using air as the medium and utilizing the compressibility of air, centralized air supply can be realized and the mechanical design and maintenance are greatly simplified; and intellectual control of operation speed can be achieved.

The present invention also has the following advantageous effects.

A pneumatic device is simple in structure, light in weight, and easy in installation and maintenance; it cannot be easily burned and can be used in high-temperature occasions, so it is safe for use; it can treat the exhaust gas easily without polluting the environment, and thus has a low cost. It is easier to adjust the input and output torques and the operating speed, and thus the pneumatic device is faster than the hydraulic and electrical manners in actuation speed; it has a high reliability and a long service life, and can realize buffering. The pneumatic device has a strong adaptability to impact loads and overloads. Under certain conditions, the pneumatic device is allowed to have self-retention, and it is suitable for long-distance transmission.

BRIEF DESCRIPTION OF THE DRAWINGS

In FIG. 1: 1—an air source; 2—a check valve; 3—an air storage tank; 4—a two-position three-way solenoid valve A; 5—a vent hole; 6—a two-position three-way solenoid valve B; 7—a throttle valve; 8—a two-position three-way solenoid valve C; 9—an air tank.

DETAILED DESCRIPTION OF EMBODIMENTS

The specific embodiments of the present invention are further described in detail with reference to the accompanying drawings.

Figure 1:
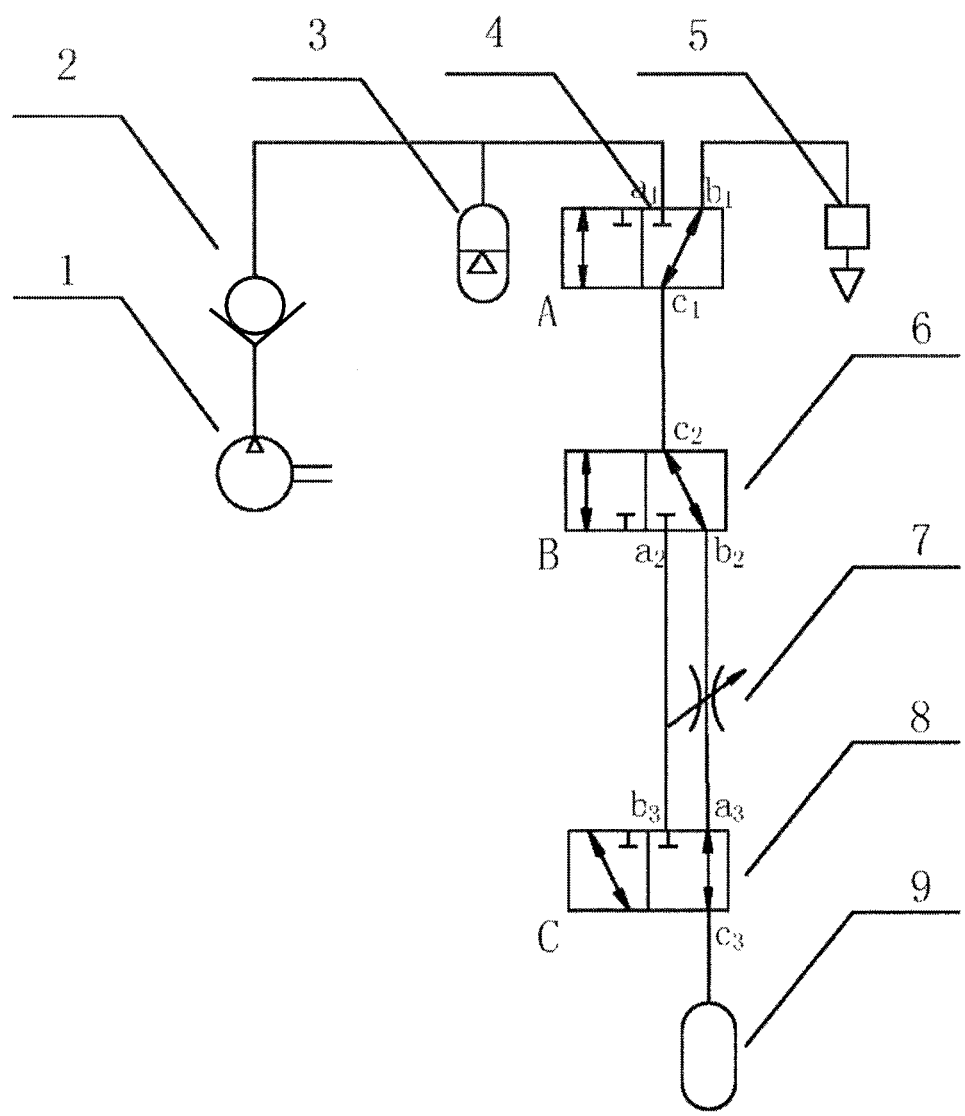
FIG. 1 is a schematic view for illustrating a structure of a four-state adjustable air path structure.

As shown in FIG. 1, a four-state adjustable air path structure is provided, wherein an air source 1 is respectively connected to an air storage tank 3 and a port $a_1$ of a two-position three-way solenoid valve A4 via a check valve 2; a port $c_1$ and a port $b_1$ of the two-position three-way solenoid valve A4 are respectively connected to a port $c_2$ of a two-position three-way solenoid valve B6 and a vent hole 5; a port $a_2$ and a port $b_2$ of the two-position three-way solenoid valve B6 are respectively connected to a port $b_3$ of a two-position three-way solenoid valve C8 and a port of a throttle valve 7; another port of the throttle valve 7 is connected to a port $a_3$ of the two-position three-way solenoid valve C8; and a port $c_3$ of the two-position three-way solenoid valve C8 is connected to an air tank 9.

The process of operation is as follows.

Figure 2:
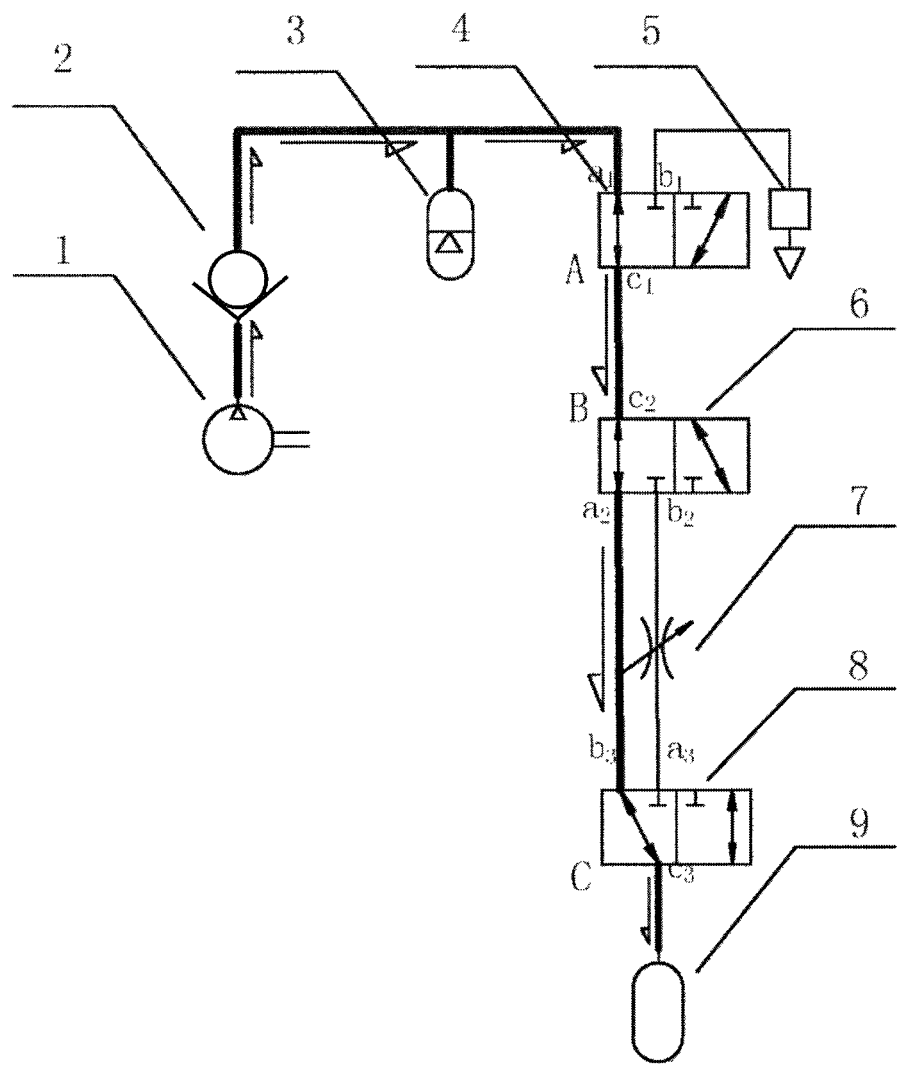
FIG. 2 is a schematic view for illustrating rapid charging of air during operation of the present invention.

FIG. 2 is a schematic view illustrating the rapid charging of air. In the four-state adjustable air path structure, when the two-position three-way solenoid valve A4 is powered on, the port $a_1$ is turned on and the port $b_1$ is turned off. At this time, if the two-position three-way solenoid valve B6 is powered on and the two-position three-way solenoid valve C8 is powered off, i.e., the ports $a_2$ and $b_3$ are turned on and ports $b_2$ and $a_3$ are turned off, the outside air sequentially passes through the air source 1, the check valve 2, the two-position three-way solenoid valve A4, the two-position three-way solenoid valve B6 and the two-position three-way, solenoid valve C8 and is introduced into the air tank 9. As a result, the air path pressure increases rapidly, and a large amount of compressed air is quickly stored within the air tank 9.

Figure 3:
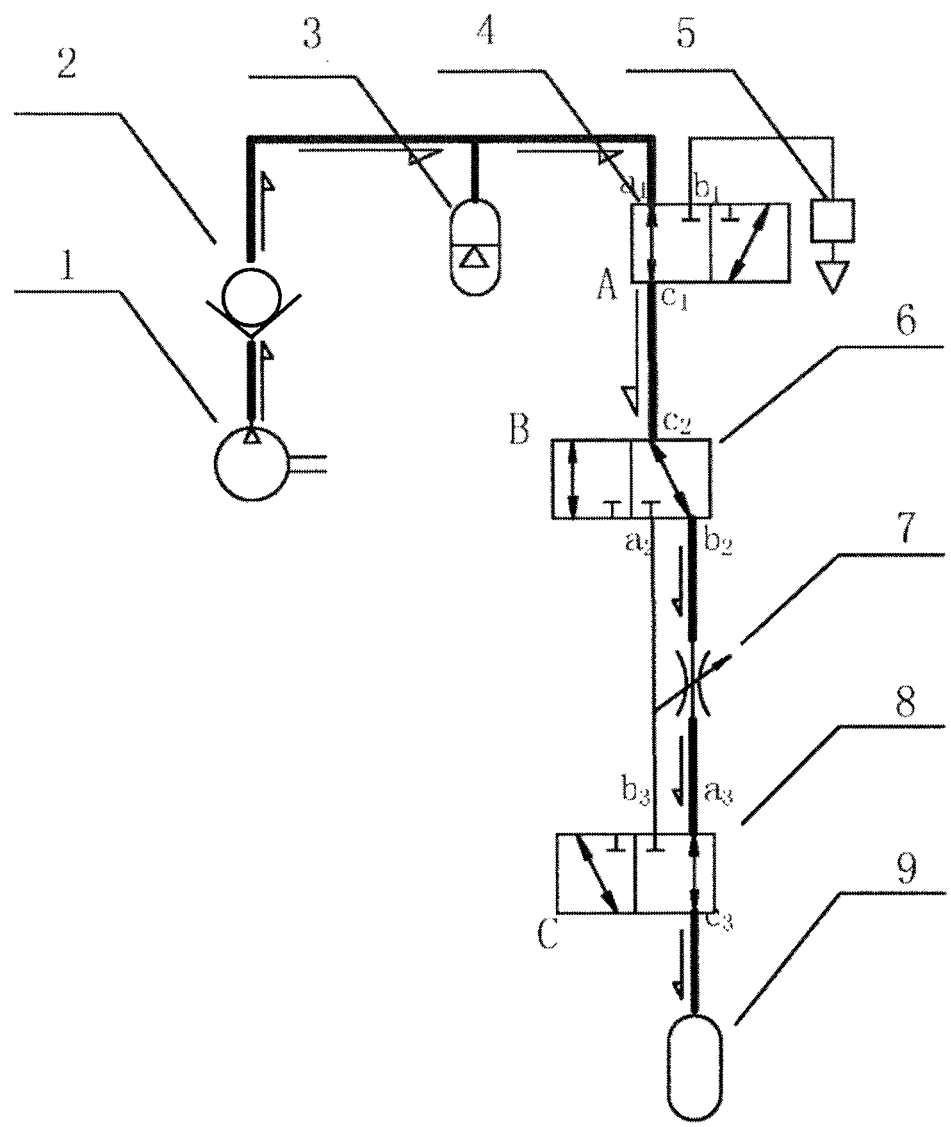
FIG. 3 is a schematic view for illustrating slow charging of air during operation of the present invention.

FIG. 3 is a schematic view illustrating the slow charging of air. In the four-state adjustable air path structure, when the two-position three-way solenoid valve A4 is powered on, the port $a_1$ is turned on and the port $b_1$ is turned off. At this time, if the two-position three-way solenoid valve B6 is powered off and the two-position three-way solenoid valve C8 is powered on, i.e., when the ports $a_3$ and $b_2$ are turned on and the ports $a_2$ and $b_3$ are turned off, the outside air sequentially passes through the air source 1, the check valve 2, the two-position three-way solenoid valve A4, the two-position three-way solenoid valve B6, the throttle valve 7 and the two-position three-way solenoid valve C8 and is slowly introduced into the air tank 9. As a result, the pressure inside the air path increases gradually, and a large amount of compressed air is slowly stored within the air tank 9.

Figure 4:
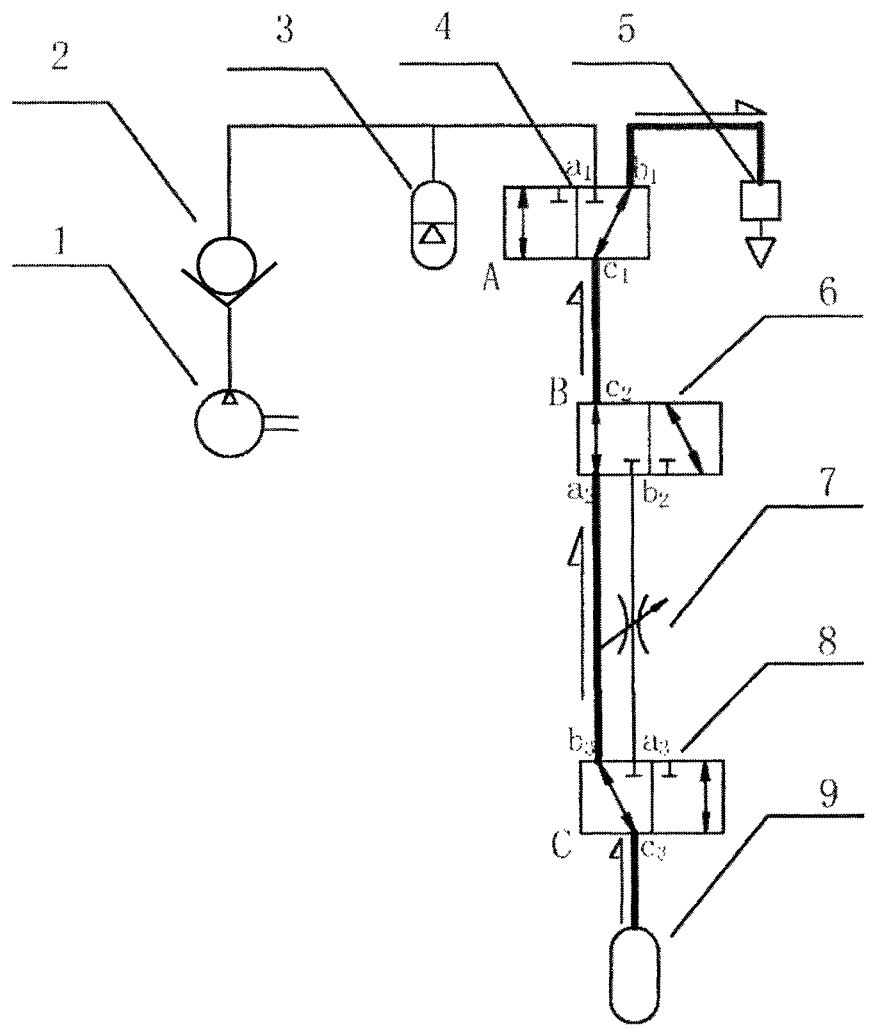
FIG. 4 is a schematic view for illustrating rapid discharging of air during operation of the present invention.

FIG. 4 is a schematic view illustrating the rapid discharging of air. In the four-state adjustable air path structure, when the two-position three-way solenoid valve C8 is powered off, the port $b_3$ is turned on and the port $a_3$ is turned off. At this time, if the two-position three-way solenoid valve B6 is powered on, i.e., the port $a_2$ is turned on and the port $b_2$ is turned off, the compressed air in the air tank 9 passes through the port $b_3$ of the two-position three-way solenoid valve C8 to the port $a_2$ of the two-position three-way solenoid valve B6, and then passes through the port $c_2$ of the two-position three-way solenoid valve B6 to the port $c_1$ of the two-position three-way solenoid valve A4 which is powered off at this time, i.e., the port $b_1$ is turned on and the port $a_1$ is turned off, and thus the air in the air path is discharged through the vent hole 5 rapidly.

Figure 5:
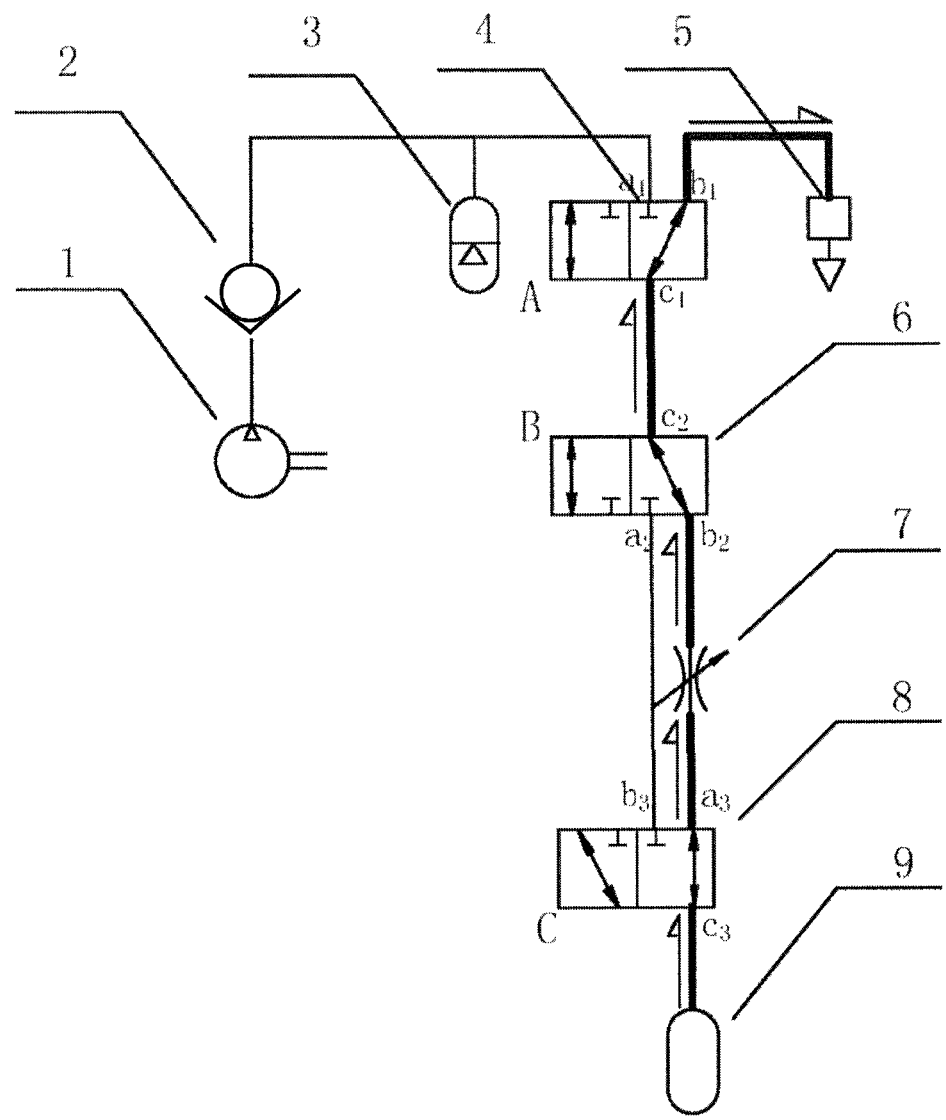
FIG. 5 is a schematic view for illustrating slow discharging of air during operation of the present invention.

FIG. 5 is a schematic view illustrating the slow discharging of air. In the four-state adjustable air path structure, when the two-position three-way solenoid valve C8 is powered on, the port $a_3$ is turned on and the port $b_3$ is turned off. At this time, if the two-position three-way solenoid valve B6 is powered off, i.e., the port $b_2$ is turned on and the port $a_2$ is turned off, the compressed air in the air tank 9 passes through the port $a_3$ of the two-position three-way solenoid valve C8, through the throttle valve 7 and to the port $b_2$ of the two-position three-way solenoid valve B6, and then passes through the port $c_2$ of the two-position three way solenoid valve B6 to the port $c_1$ of the two-position three-way solenoid valve A4 which is powered off at this time, i.e., the port $b_1$ is turned on and the port $a_1$ is turned off, and thus the air in the air path is discharged through the vent hole 5 slowly.

The invention claimed is:

1. A four-state adjustable air path structure, characterized in that: an air source (1) is respectively connected to an air storage tank (3) and a first port ($a_1$) of a first two-position three-way solenoid valve (A4) via a check valve (2); a third port ($c_1$) and a second port ($b_1$) of the first two-position three-way solenoid valve (A4) are respectively connected to a sixth port ($c_2$) of a second two-position three-way solenoid valve (B6) and a vent hole (5); a fourth port ($a_2$) and a fifth port ($b_2$) of the second two-position three-way solenoid valve (B6) are respectively connected to an eighth port ($b_3$) of a third two-position three-way solenoid valve (C8) and a first in/out port of a throttle valve (7); a second in/out port of the throttle valve (7) is connected to a seventh port ($a_3$) of the third two-position three-way solenoid valve (C8); and a ninth port ($c_3$) of the third two-position three-way solenoid valve (C8) is connected to an air tank (9).

* * * * *